(12) United States Patent
Reuche

(10) Patent No.: US 12,003,611 B2
(45) Date of Patent: Jun. 4, 2024

(54) METHOD FOR ESTABLISHING COMMUNICATION IN AN OPTICAL ACCESS NETWORK

(71) Applicant: SAGEMCOM BROADBAND SAS, Rueil Malmaison (FR)

(72) Inventor: Anthony Reuche, Rueil Malmaison (FR)

(73) Assignee: SAGEMCOM BROADBAND SAS, Bois-Colombes (FR)

( * ) Notice: Subject to any disclaimer, the term of this patent is extended or adjusted under 35 U.S.C. 154(b) by 187 days.

(21) Appl. No.: 17/349,442

(22) Filed: Jun. 16, 2021

(65) Prior Publication Data
US 2021/0409187 A1    Dec. 30, 2021

(30) Foreign Application Priority Data
Jun. 24, 2020 (FR) ..................... 2006589

(51) Int. Cl.
*H04B 10/00* (2013.01)
*H04B 10/2581* (2013.01)
(Continued)

(52) U.S. Cl.
CPC ....... *H04L 7/0075* (2013.01); *H04B 10/2581* (2013.01); *H04B 10/27* (2013.01); *H04B 10/40* (2013.01)

(58) Field of Classification Search
CPC ... H04L 7/0075; H04B 10/2581; H04B 10/27; H04B 10/40; H04Q 2011/0064; H04Q 11/0067
See application file for complete search history.

(56) References Cited

U.S. PATENT DOCUMENTS 7,609,967 B2 * 10/2009 Hochbaum ......... H04J 14/0226
                                                 398/100
7,941,055 B2 *  5/2011 Huang ................. H04J 3/1694
                                                 359/344
(Continued)

FOREIGN PATENT DOCUMENTS

EP    2152023 A2    2/2010
EP    2675102 A1   12/2013
(Continued)

OTHER PUBLICATIONS

Mar. 10, 2021 Search Report issued in French Patent Application No. 2006589.

*Primary Examiner* — Agustin Bello
(74) *Attorney, Agent, or Firm* — Williams Mullen; R. Brian Drozd

(57) ABSTRACT

An item of ONU equipment configures itself to communicate by a first transport system with OLT equipment in an optical access network, and starts a synchronisation for the first transport system and transmits by means of the first transport system. The ONU equipment transmits, via a protocol layer supervising any transport system of the optical access network, without waiting for the end of the synchronisation for the first transport system, information dependent on identifiers of the user equipment and the first transport system. When the transport system to be used is not the first transport system, the protocol layer supervising any transport system of the optical access network interrupts the synchronisation at the OLT equipment, and the ONU equipment reattempts the synchronisation with a second transport system; otherwise the synchronisation continues for the first transport system until the ONU equipment is put in communication in the optical access network.

13 Claims, 4 Drawing Sheets

(51) Int. Cl.
*H04B 10/27* (2013.01)
*H04B 10/40* (2013.01)
*H04L 7/00* (2006.01)

(56) References Cited

U.S. PATENT DOCUMENTS

| | | | | |
|---|---|---|---|---|
| 8,315,527 B2* | 11/2012 | Kimura | ............... | H04B 10/032 398/168 |
| 8,401,387 B2* | 3/2013 | Biegert | ............ | H04Q 11/0067 398/71 |
| 9,338,530 B2* | 5/2016 | Izenberg | ............ | H04Q 11/0067 |
| 11,063,783 B2* | 7/2021 | Peng | ............... | H04Q 11/0067 |
| 2006/0133809 A1* | 6/2006 | Chow | ................ | H04J 3/1694 398/66 |
| 2006/0153222 A1* | 7/2006 | Van Caenegem | ..... | H04J 3/1694 370/445 |
| 2009/0010650 A1* | 1/2009 | Tsuchiya | ............ | H04Q 11/0067 398/59 |
| 2009/0060531 A1* | 3/2009 | Biegert | ............... | H04J 14/0232 398/214 |
| 2010/0034534 A1* | 2/2010 | Niibe | ................. | H04J 14/0252 398/25 |
| 2011/0229131 A1* | 9/2011 | Izenberg | ................ | H04Q 11/00 398/45 |
| 2015/0229430 A1* | 8/2015 | Liang | .................. | H04J 14/0242 398/68 |
| 2016/0006608 A1* | 1/2016 | Khotimsky | ......... | H04L 41/0806 398/67 |
| 2017/0006361 A1* | 1/2017 | Berg | .................. | H04Q 11/0067 |
| 2017/0054719 A1* | 2/2017 | Zheng | ................. | H04L 63/0876 |
| 2017/0063462 A1* | 3/2017 | Luo | .................... | H04L 41/0803 |
| 2018/0035183 A1* | 2/2018 | Kim | ..................... | H04Q 11/0067 |
| 2018/0124481 A1* | 5/2018 | Chyi | .................. | H04Q 11/0062 |
| 2018/0198528 A1* | 7/2018 | Zhang | ................ | H04Q 11/0067 |
| 2018/0249232 A1* | 8/2018 | Putnins | ................ | H04B 10/272 |
| 2019/0273634 A1* | 9/2019 | Peng | ..................... | H04B 10/60 |
| 2019/0319709 A1* | 10/2019 | Zheng | ................... | H04B 10/40 |
| 2020/0344534 A1* | 10/2020 | Luo | .................... | H04Q 11/0067 |
| 2021/0013971 A1* | 1/2021 | Hara | ..................... | H04B 10/541 |
| 2021/0176544 A1* | 6/2021 | Luo | ...................... | H04Q 11/0071 |
| 2021/0400364 A1* | 12/2021 | Qiu | ..................... | H04Q 11/0067 |
| 2021/0409187 A1* | 12/2021 | Reuche | ................ | H04Q 11/0067 |

FOREIGN PATENT DOCUMENTS

| | | |
|---|---|---|
| EP | 3614580 A1 | 2/2020 |
| WO | 2012/158079 A1 | 11/2012 |

* cited by examiner

METHOD FOR ESTABLISHING COMMUNICATION IN AN OPTICAL ACCESS NETWORK

TECHNICAL FIELD

The present invention relates to a method for establishing communication in an optical access network of the passive optical network (PON) type, more particularly between optical line termination (OLT) equipment and user equipment called "optical network unit" (ONU).

PRIOR ART

The distribution of digital data by optical access network as far as the homes of a plurality of users, for accessing for example the internet, is achieved through an optical fibre medium. FTTH (standing for "Fibre to the Home") or FTTB (Fibre to the Building) technology is spoken of. Thus a plurality of data transport systems may coexist on the same optical fibre, thus enabling a service operator to distribute a plurality of services through a small infrastructure. Passive optical networks PON may thus be created between one or more items of optical line termination equipment OLT and numerous items of user equipment ONU, by means of wavelength coupling devices and optical user line coupling devices.

The various transport systems correspond to standardised equipment and protocols, for example the G-PON (Gigabit Passive Optical Network) system, which makes it possible to achieve a bit rate of 2.5 Gbps in the downlink direction and a bit rate of 1.2 Gbps in the uplink direction, as described by the ITU-T standard G.984, or the XG-PON (eXtended Gigabit Passive Optical Network) system, which makes it possible to achieve a bit rate of 10 Gbps in the downlink direction and a bit rate of 2.5 Gbps in the uplink direction, as described in the ITU-T standard G.988, or the XGS-PON (10 Gigabit-capable Symmetric Passive Optical) system, which makes it possible to achieve a bit rate of 10 Gbps in both the uplink and downlink directions, as described by the ITU-T standard G.9807.1.

When various transport systems coexist on the same optical fibre, each of these transport systems establishes communications by light signals using distinct carrier wavelengths ($\lambda$) or combs of carrier wavelengths, whether in the uplink direction or in the downlink direction, and/or using time division multiple access (TDMA) mechanisms on the optical fibre.

The coexistence of the various transport systems on the same optical fibre enables user equipment ONU to be configured to use, according to a user profile established with the termination equipment OLT for the user equipment ONU in question, a single transport system among those distributed via this optical fibre.

Currently, in the case where user equipment ONU must be connected to an optical fibre on which a plurality of transport systems coexist, human intervention, by an installer technician for example, is necessary in order to correctly configure the user equipment ONU to use the transport system that corresponds to the user profile registered at the termination equipment OLT. This human intervention is also necessary if a change in user profile occurs at the termination equipment OLT, for example in order to change from an optical fibre service at 500 Mbps using the G-PON protocol to an optical fibre service at 10 Gbps using the XGS-PON protocol. However, such human intervention is subject to configuration errors, which in particular gives rise to increases in telephone assistance ("hotline") requirements.

It is then desirable to overcome these drawbacks of the prior art. It is in particular desirable to provide a solution that makes it possible to reduce human interventions to enable user equipment ONU, capable of communicating by means of a plurality of transport systems coexisting on the same optical fibre, to be configured to communicate via a particular transport system, among a plurality of possible transport systems.

It is in particular desirable to accelerate how such user equipment is put in communication when new.

It is in particular desirable to provide a solution that makes it possible to reduce human interventions when changing user profile.

DISCLOSURE OF THE INVENTION

A method is proposed for putting user equipment of the ONU type in communication with line termination equipment of the OLT type in an optical access network offering various transport systems, the user equipment supporting at least two transport systems, each transport system being a communication set comprising a dedicated protocol, the method comprising the following steps:
  the user equipment configures itself to communicate by means of a first transport system among the transport systems supported by the user equipment;
  the user equipment starts a synchronisation with the line termination equipment for the first transport system;
  the user equipment transmits, via a protocol layer supervising any transport system of the optical access network, without waiting for the synchronisation with the line termination equipment for the first transport system to have ended, information dependent on an identifier of the user equipment and an identifier of the first transport system;
  when the transport system to be used by the user equipment is not the first transport system, the protocol layer supervising any transport system of the optical access network at the line termination equipment interrupts the synchronisation, and the user equipment reattempts the synchronisation with a second transport system among the transport systems supported by the user equipment;
  when the transport system to be used by the user equipment is the first transport system, the line termination equipment continues the synchronisation for the first transport system until the user equipment is put in communication in the optical access network.

Thus the configuration of the user equipment of the ONU type is automatic, without any human intervention. In addition, when the user equipment of the ONU type must change transport system, the end of the synchronisation with the transport system initially selected is not awaited, which accelerates the putting of the user equipment of the ONU type in communication in the optical access network.

According to a particular embodiment, the line termination equipment obtains, in a database, a user profile associated with the identifier of the user equipment, the user profile including the transport system identifier to be used by the user equipment. Thus the putting of the user equipment in communication in the optical access network conforms to a user profile provided.

According to a particular embodiment, when no user profile is associated with the identifier of the user equipment, the protocol layer supervising any transport system of the optical access network at the line termination equipment also interrupts the synchronisation. Thus it is anticipated that the synchronisation cannot succeed, more particularly with regard to the operations of authenticating the user equipment, because of a lack of user profile.

According to a particular embodiment, said information is the juxtaposition of the identifier of the user equipment and the identifier of the transport system configured by the user equipment. Thus said information is easily formatted and used.

According to a particular embodiment, when the user equipment does not detect any signals, while being configured for the first transport system, during a time window of predefined duration, the user equipment then tests another transport system among those supported by the user equipment. Thus the user equipment of the ONU type can in the end be put in communication in the optical access network, even when a transport system supported by the user equipment of the ONU type is not or is no longer supported by the line termination equipment of the OLT type.

A method is also proposed for putting user equipment of the ONU type in communication with line termination equipment of the OLT type in an optical access network, the method being implemented by the user equipment, the user equipment supporting at least two transport systems, each transport system being a communication set comprising a dedicated protocol, the method comprising the following steps:
configuring itself to communicate by means of a first transport system among the transport systems supported by the user equipment;
starting a synchronisation with the line termination equipment for the first transport system;
transmitting via a protocol layer supervising any transport system of the optical access network, without waiting for the synchronisation with the line termination equipment for the first transport system to have ended, information dependent on an identifier of the user equipment and on an identifier of the first transport system;
when the synchronisation is interrupted, reattempting the synchronisation with a second transport system among the transport systems supported by the user equipment, and otherwise continuing the synchronisation for the first transport system until the user equipment is put in communication in the optical access network.

A method is also proposed for putting user equipment of the ONU type in communication with line termination equipment of the OLT type in an optical access network, the method being implemented by the line termination equipment, the line termination equipment supporting various transport systems, each transport system being a communication set comprising a dedicated protocol, the method comprising the following steps:
starting a synchronisation with the user equipment, at the initiative of the latter, for a first transport system;
receiving, via a protocol layer supervising the transport systems supported by the line termination equipment, without waiting for the synchronisation with the user equipment for the first transport system to have ended, information dependent on an identifier of the user equipment and on an identifier of the first transport system;
when the transport system to be used by the user equipment is not the first transport system, interrupting the synchronisation by the protocol layer supervising any transport system of the optical access network;
when the transport system to be used by the user equipment is the first transport system, continuing the synchronisation for the first transport system until the user equipment is put in communication in the optical access network.

A computer program is also proposed, which can be stored on a carrier and/or downloaded from a communication network, in order to be read by a processor. This computer program comprises instructions for implementing the method implemented by the user equipment, as mentioned above, or the method implemented by the line termination equipment as mentioned above, when said program is executed by the processor. The invention also relates to an information storage medium storing such a computer program.

User equipment of the ONU type is also proposed, intended to be put in communication with line termination equipment of the OLT type in an optical access network, the user equipment supporting at least two transport systems, each transport system being a communication set comprising a dedicated protocol, the user equipment comprising:
means for configuring themselves for communicating by means of a first transport system among the transport systems supported by the user equipment;
means for starting a synchronisation with the line termination equipment for the first transport system;
means for transmitting, via a protocol layer supervising any transport system of the optical access network, without waiting for the synchronisation with the line termination equipment for the first transport system to have ended, information dependent on an identifier of the user equipment and on an identifier of the first transport system;
when the synchronisation is interrupted, means for reattempting the synchronisation with a second transport system among the transport systems supported by the user equipment, and otherwise means for continuing the synchronisation for the first transport system until the user equipment is put in communication in the optical access network.

Line termination equipment of the OLT type is also proposed, intended to be put in communication with user equipment of the ONU type in an optical access network, the line termination equipment supporting various transport systems, each transport system being a communication set comprising a dedicated protocol, the line termination equipment comprising:
means for starting a synchronisation with the user equipment, at the initiative of the latter, for a first transport system;
means for receiving, via a protocol layer supervising the transport systems supported by the line termination equipment, without waiting for the synchronisation with the user equipment for the first transport system to have ended, information dependent on an identifier of the user equipment and on an identifier of the first transport system;
when the transport system to be used by the user equipment is not the first transport system, means for interrupting the synchronisation by the protocol layer supervising any transport system of the optical access network;
when the transport system to be used by the user equipment is the first transport system, means for continuing the synchronisation for the first transport system until the user equipment is put in communication in the optical access network.

An optical access network is also proposed, comprising line termination equipment of the OLT type as mentioned above and at least one item of user equipment of the ONU type as mentioned above.

BRIEF DESCRIPTION OF THE DRAWINGS

The features of the invention mentioned above, as well as others, will emerge more clearly from the reading of the following description of at least one example embodiment, said description being made in relation to the accompanying drawings, among which.

DETAILED DISCLOSURE OF EMBODIMENTS

Figure 1A:
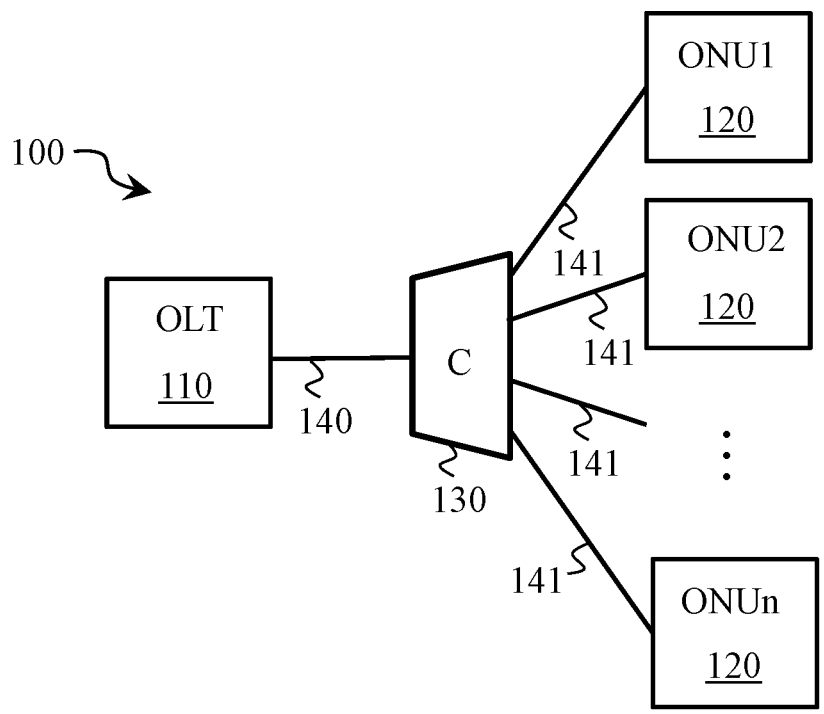
FIG. 1A illustrates schematically a first arrangement of an optical access network, wherein the present invention can be implemented.

FIG. 1A illustrates schematically a first arrangement of an optical access network 100, of the PON type, wherein the present invention can be implemented. The optical access network 100 comprises optical line termination OLT equipment 110 (hereinafter simply referred to as OLT equipment) and a plurality of items of user equipment called "optical network units" ONU 120 (labelled ONU1, ONU2, . . . , ONUn in FIG. 1A and hereinafter simply referred to as ONU equipment). Each item of ONU equipment 120 is capable of communicating with the OLT equipment 110 by means of a plurality of transport systems coexisting on the same optical fibre 140. A communication set comprising a dedicated protocol is referred to as a transport system. Each transport system is potentially also defined by one or more dedicated carrier wavelengths in the uplink direction (i.e. from ONU equipment 120 to the OLT equipment 110) and in the downlink direction (i.e. from the OLT equipment 110 to the ONU equipment 120). Typically, the transport systems have different performances, such as different bit rates, and are therefore adapted to offer different services.

At least two transport systems coexist on the optical fibre 140. In a particular embodiment, at least three transport systems coexist on the optical fibre 140. According to a particular embodiment, the transport systems are, at least, a transport system of the G-PON type, a transport system of the XG-PON type and for example a transport system of the XGS-PON type.

According to other embodiments, at least one of the transport systems is of the NG-PON2 type ("Next-Generation Passive Optical Network 2", as defined in the ITU-T standard G.989), or of the XG-PON2 type (symmetrical bit rate XG-PON), or of the EPON type ("Ethernet Passive Optical Network").

In another embodiment, at least one of the transport systems is compatible with an optical transport technology of the 100 G type able to achieve 100 Gbit/s.

In a particular embodiment, the ONU equipment 120 is integrated in residential gateways.

To make it possible to connect the plurality of items of ONU equipment 120 to the optical fibre 140, the optical access network 100 comprises a coupling device C 130 adapted for coupling as many optical user lines 141 as there are items of ONU equipment 120.

Figure 1B:
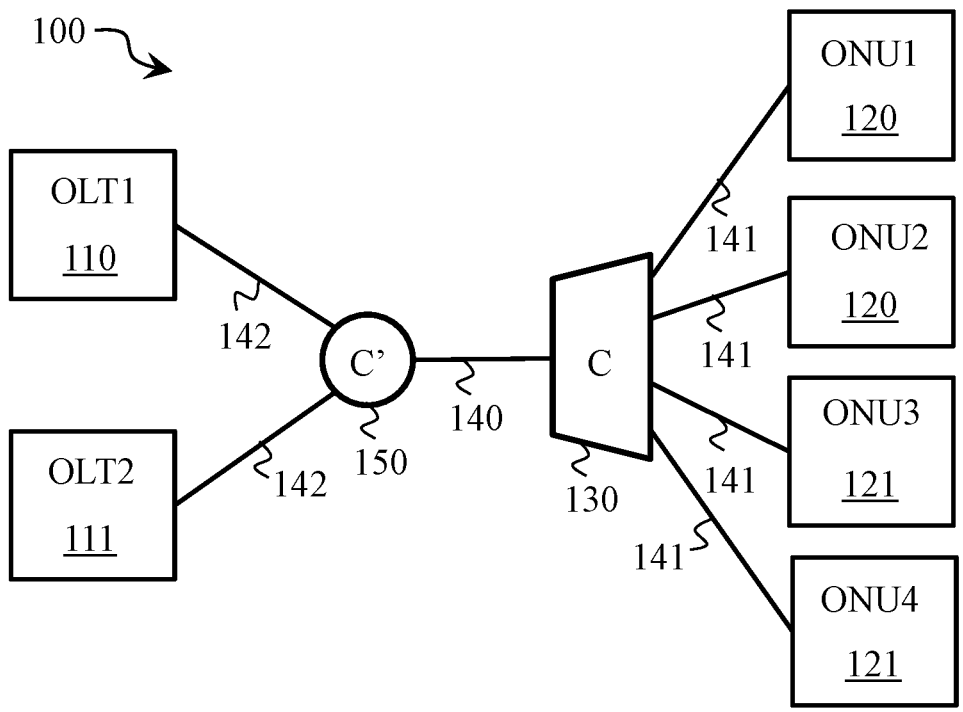
FIG. 1B illustrates schematically a second arrangement of an optical access network, wherein the present invention can be implemented.

FIG. 1B illustrates schematically a second arrangement of an optical access network 100, wherein the present invention can be implemented. Compared with the first arrangement in FIG. 1A, the second arrangement in FIG. 1B comprises a wavelength coupling device C' 150 making it possible to couple two other optical lines 142 to the optical fibre 140. These other optical lines 142 enable at least one other item of OLT equipment (labelled OLT2 111 in FIG. 1B) to coexist with the OLT equipment 110 (labelled OLT1 110 in FIG. 1B) in the optical access network 100. Thus, on the same optical fibre 140, the ONU equipment 120 (labelled ONU1 and ONU2 in FIG. 1B) can communicate with the equipment OLT1 110, and ONU equipment 121 (labelled ONU3 and ONU4 in FIG. 1B) can communicate with the equipment OLT2 111.

The coupling devices C 130 and C' 150 are for example wavelength selective switches WSS adapted for multiplexing wavelengths in one direction and demultiplexing wavelengths in the opposite direction.

Figure 2:
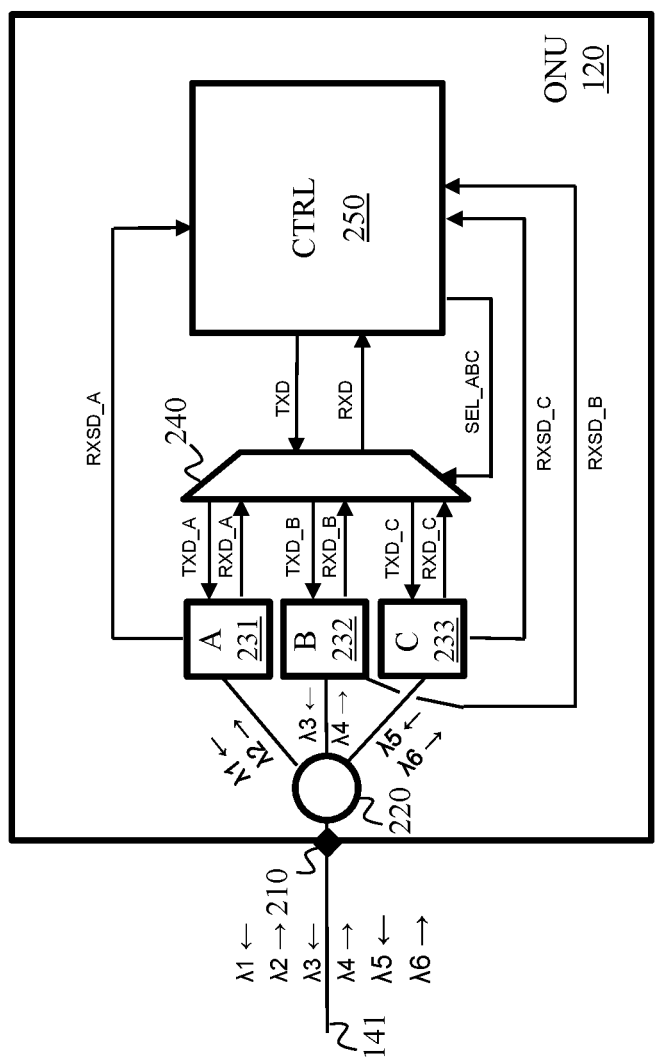
FIG. 2 illustrates schematically an embodiment of user equipment of the optical access network.

FIG. 2 illustrates schematically an arrangement of ONU equipment 120.

The ONU equipment 120 comprises an optical coupling 210 to which the optical fibre is connected, for example the user optical line 141, making it possible to connect the ONU equipment 120 to the rest of the optical access network 100.

The ONU equipment 120 further comprises a wavelength multiplexer/demultiplexer 220 making it possible to combine and respectively to separate the optical signals carried by the optical fibre 141 plugged into the optical coupling 210.

By way of illustration, in FIG. 2, the ONU equipment 120 comprises three branches (A, B and C). Each branch supports one transmission direction (TX) and one reception direction (RX), each having a particular carrier wavelength $\lambda 1$, $\lambda 3$ and $\lambda 5$ in transmission, and $\lambda 2$, $\lambda 4$ and $\lambda 6$ in reception) or a comb of particular carrier wavelengths.

It should be noted that the same branch may support a plurality of protocols and therefore a plurality of transport systems. When a plurality of transport systems use the same carrier wavelengths in the optical access network, the use of these carrier wavelengths is shared timewise between the transport systems according to a time division multiple access TDMA principle.

Thus it should also be noted that FIG. 2 shows three branches by way of illustration and that the ONU equipment 120 can therefore comprise a different number of branches.

Optoelectrical interfaces 231, 232, 233 each comprise a laser diode (for the transmission TX) and a photodiode (for the reception RX) making it possible to convert optical signals into electrical signals and vice versa.

The ONU equipment 120 comprises a control unit CTRL 250.

When the ONU equipment 120 comprises a plurality of branches, the ONU equipment 120 further comprises an electrical-signal switch 240. The branch to be used is selected by the control unit CTRL 250 by means of a selection line SEL_ABC.

Thus, when the branch A is selected by the control unit CTRL 250 and optical signals are detected in reception on the branch A, the optoelectrical interface 231 informs the control unit CTRL 250 thereof by means of a signal RXSD_A. The electrical-signal switch 240 is then configured to route signals present on a signal line RXD_A coming from the optoelectrical interface 231 to a signal line RXD at the input of the control unit CTRL 250. In addition, when optical signals are to be transmitted by means of the branch A, the electrical-signal switch 240 is configured to route signals present on a signal line TXD coming from the control unit CTRL 250 to a signal line TXD_A at the input of the optoelectrical interface 231.

In a similar manner, when the branch B is selected by the control unit CTRL 250 and optical signals are detected in reception on the branch B, the optoelectrical interface 232 informs the control unit CTRL 250 thereof by means of a signal RXSD_B. The electrical-signal switch 240 is then configured to route signals present on a signal line RXD_B coming from the optoelectrical interface 232 to the signal line RXD. In addition, when optical signals are to be transmitted by means of the branch B, the electrical-signal switch 240 is configured to route signals present on the signal line TXD to a signal line TXD_B at the input of the optoelectrical interface 232.

Finally, when the branch C is selected by the control unit CTRL 250 and optical signals are detected in reception on the branch C, the optoelectrical interface 233 informs the control unit CTRL 250 thereof by means of a signal RXSD_C. The electrical-signal switch 240 is then configured to route signals present on a signal line RXD_C coming from the optoelectrical interface 233 to the signal line RXD. In addition, when optical signals are to be transmitted by means of the branch C, the electrical-signal switch 240 is configured to route signals present on the signal line TXD to a signal line TXD_C at the input of the optoelectrical interface 233.

An arrangement of OLT equipment 110 can easily be derived from the arrangement in FIG. 2. In the case of transmissions by TDMA access, the control unit CTRL 250, by means of the selection line SEL_ABC, times the selection of the branch A, B or C (when the OLT equipment 110 comprises three branches) applicable for each time slot defined in the time sharing of the access to the optical fibre. When the various transport systems can be used simultaneously in time, the signal lines TXD_A, TXD_B, TX_C, RXD_A, RXD_B and RXD_C are directly connected to the control unit CTRL 250 which, in the absence of an electrical-signal switch 240, is configured to manage them in parallel.

Figure 3:
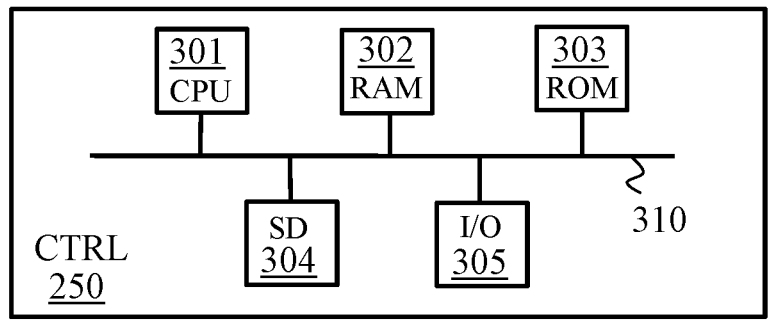
FIG. 3 illustrates schematically an example of hardware arrangement of a control unit of the embodiment in FIG. 2.

FIG. 3 illustrates schematically an example of hardware arrangement of the control unit CTRL 250. The example of hardware arrangement presented comprises, connected by a communication bus 310: a processor CPU 301; a random access memory RAM 302, a read only memory ROM 303 or a flash memory; a storage unit or a storage medium reader, such as an SD (Secure Digital) card reader 304 or a hard disk HDD (hard disk drive); and at least one set of inputs/outputs I/O 305 for in particular connecting the signal lines TXD and RXD.

The processor CPU 301 is capable of executing instructions loaded in the RAM memory 302 from the ROM memory 303, from an external memory (such as an SD card), from a storage medium (such as the hard disk HDD), or from a communication network (other than the optical access network 100). When the control unit CTRL 250 is powered up, the processor CPU 301 is capable of reading instructions from the RAM memory 302 and executing them. These instructions form a computer program causing the implementation, by the processor CPU 301, of all or some of the behaviours, algorithms and steps described here.

Thus all or some of the behaviours, algorithms and steps described here can be implemented in software form by executing a set of instructions by a programmable machine, such as a DSP (digital signal processor) or a microcontroller or a processor. All or some of the behaviours, algorithms and steps described here can also be implemented in hardware form by a machine or a component (chip), such as an FPGA (field-programmable gate array) or an ASIC (application-specific integrated circuit). Thus the control unit CTRL 250 comprises electronic circuitry adapted and configured for implementing the behaviours, algorithms and steps described here.

Figure 4:
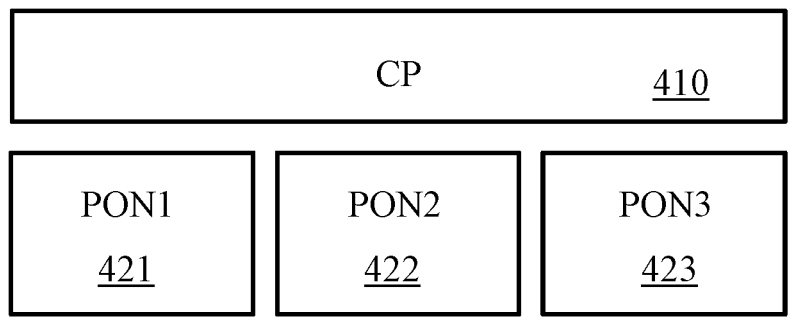
FIG. 4 illustrates schematically a protocol arrangement implemented by the control unit.

FIG. 4 illustrates schematically a protocol arrangement implemented by the control unit CTRL 250.

The protocol arrangement in FIG. 4 comprises a first protocol stack PON1 421 dedicated to a first transport system of the optical access network 100, a second protocol stack PON2 422 dedicated to a second transport system of the optical access network 100, and a third protocol stack PON3 423 dedicated to a third transport system of the optical access network 100. The arrangement can thus comprise one or more other protocol stacks dedicated to one or more other respective transport systems of the optical access network 100, in parallel with the protocol stacks PON1 421, PON2 422 and PON3 423.

These protocol stacks are supervised by a common protocol layer CP 410. Thus the common protocol layer CP 410 can communicate in the optical access network 100 by any of the supervised protocol stacks.

In a particular embodiment, the common protocol layer 410 acts during the synchronisation phase of the physical layer of the ONU equipment 120 and the OLT equipment 110.

According to a particular embodiment, the common protocol layer CP 410 is of the OMCI type (ONU Management and Control Interface), as described by the ITU-T standard G.988. The OMCI protocol layer defines a mechanism and message formats that can be used by OLT equipment for configuring, managing and monitoring ONU equipment that is connected thereto. The messages of the OMCI protocol layer are transported through a channel named OMCC (ONU Management and Control Channel) and are encapsulated in GEM (GPON Encapsulation Method) frames. In a variant, the common protocol layer CP 410 is a sublayer of the OMCI protocol layer, or any other protocol layer or sublayer supervising the protocol stacks PON1 421, PON2 422 and PON3 423.

Figure 5:
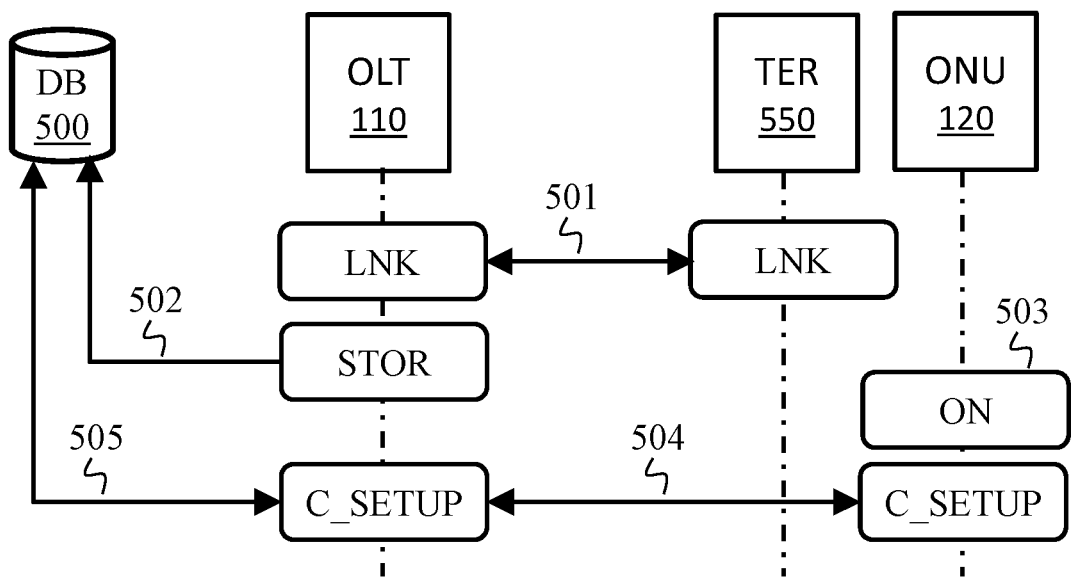
FIG. 5 illustrates schematically exchanges in the context of an identifier of user equipment of the optical access network being associated with a user profile.

FIG. 5 illustrates schematically exchanges in the context of associating an identifier of user equipment ONU 120, such as a serial number, with a user profile.

When a user subscribes to a service (for example, but not exclusively, a subscription for access to the internet), the user chooses a particular service corresponding to his requirements and the technical characteristics of which are known and defined (bit rate, transport system on optical fibre, data volume, other services accessible, etc.). User profiles describing which services are accessible to the users with which they are respectively associated describe these technical characteristics and are stored in a database DB 500 accessible from the OLT equipment 110. Over the course of time, the services to be made accessible to a user via his ONU equipment 120 may change, and thus the user profile associated with this user may change accordingly. However, at any moment, a user profile enables only one transport system to the ONU equipment 120 to which said user profile is applicable. For example, a service operator may over time change his optical access network infrastructure 100, and add transport systems that the ONU equipment 120 could natively use but which was up until then not made available to it via the optical access network 100. The service operator may also over time change his optical access network infrastructure 100 by eliminating one or more transport systems present up until then.

The OLT equipment 110 must be in a position to make the link between the ONU equipment 120 installed at the home of a user and the user profile applicable to this user. It is possible to provision the database DB 500 in advance, by associating an identifier of the ONU equipment 120 in question with the applicable user profile. This does however require making this association before providing the ONU equipment 120 to the user, which prevents provisioning distribution points of the ONU equipment in advance, and which may require procedures that are burdensome and complex for the service operator. FIG. 5 proposes an alternative approach that simplifies this phase, by provisioning the database DB 500 after supplying the ONU equipment 120 to the user.

When the ONU equipment 120 is installed at the user, the user or an installer uses a terminal TER 550 for declaring the link between the ONU equipment 120 and the user profile. The terminal TER 550 is for example a computer, a mobile telephone, a smartphone or a tablet. The terminal TER 550 comprises an application or a browser for connecting to a server, for example forming part of the OLT equipment 110, in order to provide information to be associated with a user profile stored in the database DB 500. The server may for example export a web portal to enable the user or the installer to enter information. In a variant, the terminal TER 550 declares to the server the link between the ONU equipment 120 and the user profile by a text message of the SMS (Short Message Service) type.

Let us consider by way of illustration that the server in question is loaded by the OLT equipment 110.

Thus, in a step 501, the terminal TER 550 interacts with the OLT equipment 110 to provide information about association between an identifier of the ONU equipment 120 being installed at the user and information representing the user profile (operation labelled LNK in FIG. 5). For example, the identifier of the ONU equipment 120 is a serial number entered on a casing of the ONU equipment 120 or a packaging box of the ONU equipment 120, which the user or the installer enters via the terminal TER 550. According to another example, the identifier of the ONU equipment 120, such as the serial number thereof, is presented on the casing of the ONU equipment 120 or the packaging box thereof by means of a bar code, optionally two dimensional (referred to as QR code), and the terminal TER 550 is provided with an optical reader adapted for scanning such bar codes. According to yet another example, the identifier of the ONU equipment 120, such as the serial number thereof, is presented by the ONU equipment 120 via a web server forming part of the ONU equipment 120 and accessible via a local area network LAN interface of the ONU equipment 120. The information representing the user profile may be a customer number or a service contract number.

In a step 502, the OLT equipment 110 stores in the database DB 500 the link between the user profile and the ONU equipment 120 supplied to the corresponding user (operation labelled STOR in FIG. 5). Thus, when the ONU equipment 120 in question subsequently seeks to be put in communication in the optical access network 100 and thus to gain access, the OLT equipment 110 is able to determine which technical services and characteristics correspond to the user profile applicable.

In a step 503, the ONU equipment 120 is switched on (operation labelled ON in FIG. 5) and is connected to the user optical line 141 intended for the user in question.

In a step 504, the ONU equipment 120 and the OLT equipment 110 interact in order to configure the ONU equipment 120 to use the transport system as defined in the applicable user profile (operation labelled C SETUP in FIG. 5). During this operation, the OLT equipment 110 in a step 505 accesses the database DB 500 in order to recover the applicable user profile according to an ONU equipment identifier submitted by the ONU equipment 120. This aspect is detailed hereinafter in relation to FIG. 6.

Figure 6:
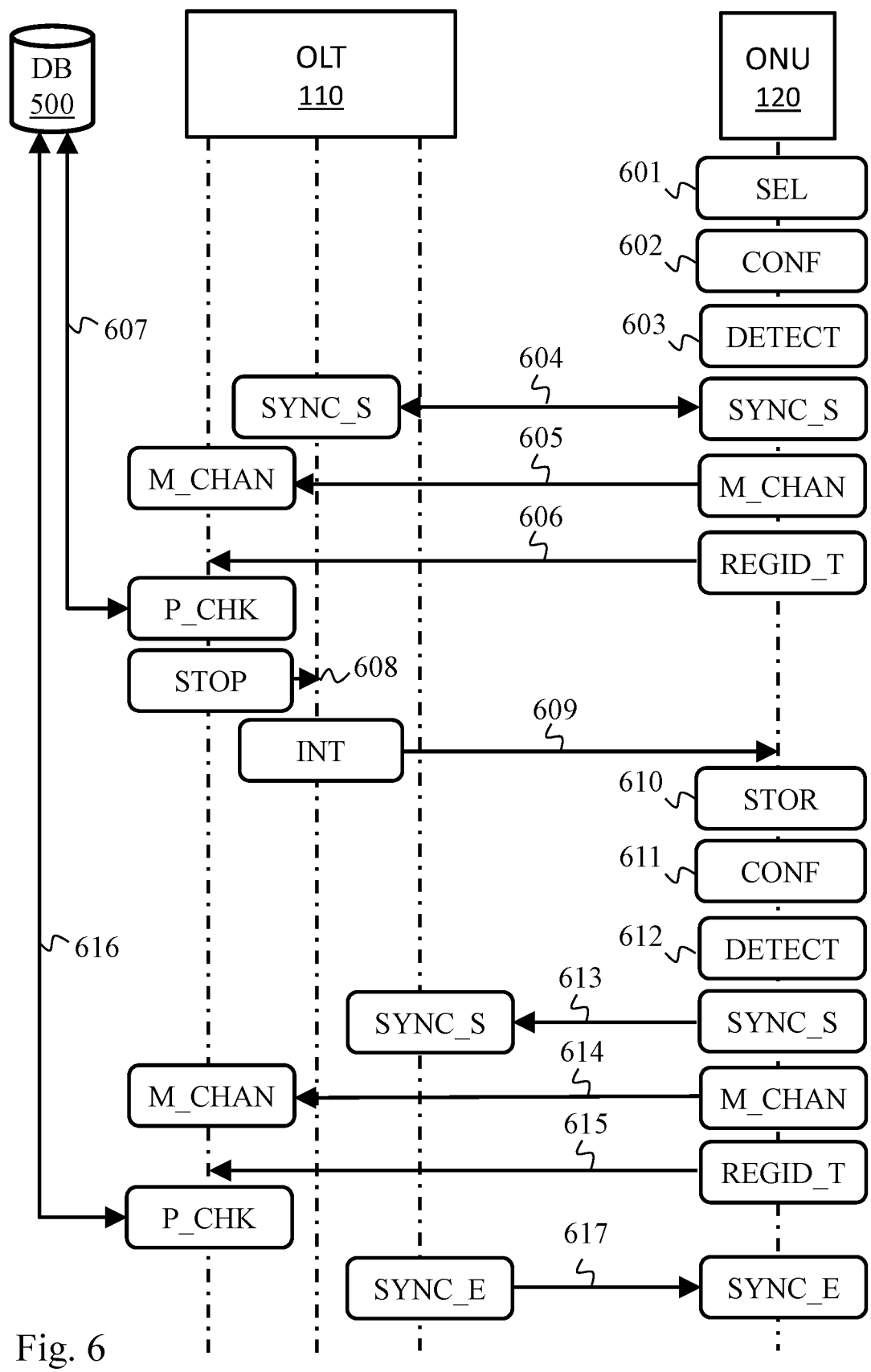
FIG. 6 illustrates schematically exchanges in the context of the user equipment being put in communication with termination equipment of the optical access network in accordance with the user profile.

FIG. 6 illustrates schematically exchanges in the context of putting ONU equipment 120 in communication with the OLT equipment 110 in accordance with the user profile applicable. It is considered, at the launch of the algorithm in FIG. 6, that the database DB 500 is provided with the user profile applicable to the ONU equipment 120, in association with the identifier of the ONU equipment 120. When the algorithm in FIG. 6 is launched, the ONU equipment 120 is capable of communicating in the optical access network 100 by means of at least two distinct transport systems (or at least three distinct transport systems in a particular embodiment), but does not have knowledge of the transport system declared in the user profile applicable.

In a step 601, the ONU equipment 120 starts and selects (operation labelled SEL in FIG. 6) a default transport system among the transport systems supported by the ONU equipment 120. For example, information representing the default transport system is stored in a parameter WanMode in non-volatile memory of the ONU equipment 120. For example, the parameter WanMode indicates that the ONU equipment 120 must by default use a transport system of the G-PON type, which may however not correspond to the transport system declared in the applicable user profile.

In a step 602, the ONU equipment 120 configures itself to enable it to communicate in the optical access network 100 by using the default transport system (operation labelled CONF in FIG. 6). The ONU equipment 120 for example establishes a dedicated driver, and configures the appropriate branch (FIG. 2) to transmit and receive signals via the default transport system.

In a step 603, the ONU equipment 120 waits until it detects optical signals of carrier wavelength (or of comb of carrier wavelengths) associated with the transport system configured (operation labelled DETECT in FIG. 6).

In a variant embodiment, wherein the ONU equipment 120 does not have any information defining a default transport system (e.g. parameter WanMode set at a value not representing a default transport system), the ONU equipment 120 goes directly into optical signal detection mode. The ONU equipment 120 can then determine the carrier wavelength (or the comb of carrier wavelengths) of the optical signals detected and determine therefrom which transport system to select to configure itself.

In a step 604, the ONU equipment 120 starts an operation (start labelled SYNCS in FIG. 6) of synchronisation with the OLT equipment 110 according to the transport system configured. The ONU equipment 120 then submits its identifier, such as its serial number. As defined for example in the ITU-T standard G.984.1 for a transport system of the G-PON type, this synchronisation operation may take a certain amount of time. It is however possible not to wait for the end of this synchronisation operation at the protocol stack of the transport system in question to commence transmitting messages according to the common protocol layer CP 410, provided that the OLT equipment 110 has recognised that the identifier submitted by the ONU equipment 120 corresponds to an authorised identifier.

Typically, the synchronisation operation starts with a detection of start of frame by the ONU equipment 120. The start of frame is for example marked by a physical control block PCB with a dedicated synchronisation field PSYNC. Considering that the ONU equipment 120 has detected such a frame start (e.g. PSYNC frame containing a valid value), the ONU equipment 120 is able to determine the instants of starts of following cycles (division of the time into cycles of predefined duration). The ONU equipment 120 then waits to receive network parameters (e.g. in a message called "Upstream Overhead") and configures itself in agreement with these network parameters. Then, on request from the OLT equipment 110, the ONU equipment 120 transmits its identifier (e.g. serial number). In the case where the identifier submitted by the ONU equipment 120 corresponds to an authorised identifier, telemetry ("ranging") exchanges occur in order to determine an equalisation delay to be applied by the ONU equipment 120 in its transmissions in the optical access network 100 to avoid collisions with other ONU equipment present in the optical access network 100 and to compensate for any differences in length between the user optical lines 141. At this moment, a control channel by means of the common protocol layer CP 410 can be established, although the synchronisation operation is not completed for the protocol of the transport system. This is because, to complete the synchronisation operation, exchanges still remain to be made in order to authenticate the ONU equipment 120, beyond the identification provided by its identifier (e.g. serial number). An authentication-key check, seen as a password and supplied by the ONU equipment 120 to the OLT equipment 110, is then implemented. This type of operation is well known for being particularly greedy of time.

Thus, in a step 605, a control channel by means of the common protocol layer CP 410 is established between the OLT equipment 110 and the ONU equipment 120 (operation labelled M CHAN in FIG. 6) without waiting for the end of the synchronisation operation at the transport system configured by the ONU equipment 120.

Once the control channel is established, the ONU equipment 120 transmits (operation labelled REGID_T in FIG. 6) to the OLT equipment 110, in a step 606, information dependent on its identifier and on an identifier of the transport system configured (i.e. for which the synchronisation was initiated). This information is here referred to as "registration identifier RegID". By applying a predefined operation, the OLT equipment 110 is capable of finding, from the registration identifier RegID, the identifier of the ONU equipment 120 and the identifier of the transport system configured by the ONU 120.

According to a particular embodiment, the registration identifier RegID is the juxtaposition of the identifier of the ONU equipment 120 and the identifier of the transport system configured by the ONU equipment 120 (each typically being represented by a predefined number of digits).

In one embodiment, the registration identifier RegID is based on the identifier of the ONU equipment 120 corresponding to the identifier used in the step 604 of the synchronisation of the physical layer labelled SYNCS, that is to say the registration identifier RegID is obtained from the serial number of the ONU equipment 120.

In one example, the serial number of the ONU equipment 120 is 850625463. The ONU equipment 120 is compatible with two transport systems, respectively G-PON and XGS-PON. The identifier of the transport system G-PON is 01. The identifier of the transport system XGS-PON is 02. The registration identifier RegID can be obtained by concatenating its serial number with a transport identifier. Thus, for the ONU equipment 120, the registration identifier RegID corresponding to the transport system G-PON is 85062546301, and the registration identifier RegID corresponding to the transport system XGS-PON is 8506256302.

In other examples, various juxtapositions of the identifier of the ONU equipment 120 and the identifier of the transport system configured by the ONU equipment 120 can be used, as they stand, and listed non-exhaustively: a particular concatenation, or an operation of the modulo type, or a binary operation such as an EXCLUSIVE OR (XOR operation).

In another embodiment, the identifier of the ONU equipment 120 used for obtaining the registration identifier RegID corresponds to a part of the serial number of the ONU equipment 120.

In another embodiment, the identifier of the ONU equipment 120 used for obtaining the registration identifier RegID corresponds to a designation element attributed by the manufacturer of said ONU equipment 120 and different from its serial number, or attributed by the service operator.

In a step 607, the OLT equipment 110 obtains, at the common protocol layer CP 410, from the registration identifier RegID, the identifier of the ONU equipment 120 and the identifier of the transport system configured by the ONU equipment 120. Then the OLT equipment 110 checks, from the database DB 500, which transport system is declared in the user profile associated with the identifier submitted by the ONU equipment 120 (operation labelled P_CHK in FIG. 6).

In a step 608, the OLT equipment 110 checks that the transport system that is declared in the user profile corresponds to the identifier of the transport system configured by the ONU equipment 120. Let us consider here, by way of illustration, that this is not the case. Then, in the OLT equipment 110, the common protocol layer CP 410 instructs the protocol stack (for example the protocol stack PON2 422) dedicated to the transport system configured by the ONU equipment 120, and for which the synchronisation with the ONU equipment 120 is under way, to stop the synchronisation with the ONU equipment 120. Thus, in a step 609, the protocol stack in question interrupts the synchronisation with the ONU equipment 120, typically according to the conditions defined by the current standard for the transport system in question (e.g. the ITU-T standard G.984 for a transport system of the G-PON type, the ITU-T standard G.9807 for a transport system of the XGS-PON type, etc.).

Should the database DB 500 not yet be provided with an association between the identifier of the ONU equipment 120 and a user profile, then the common protocol layer CP 410 instructs also said protocol stack to stop the synchronisation with the ONU equipment 120, which must then reiterate its attempt to connect to the optical access network 100.

In a step 610, the ONU equipment 120 detects that the synchronisation with the OLT equipment 110 has been interrupted, and the ONU equipment 120 updates (operation labelled STOR in FIG. 6) the information defining the default transport system, that is to say the WanMode parameter, with another transport system with which the ONU equipment 120 is compatible and not yet tested by the ONU equipment 120. In this way, when the ONU equipment 120 is next started up, the ONU equipment 120 does not test first the transport system for which the synchronisation has just been interrupted by the OLT equipment 110.

In a step 611, the ONU equipment 120 configures itself to enable it to communicate in the optical access network 100 using this other transport system (operation labelled CONF in FIG. 6). The ONU equipment 120 establishes for example a dedicated driver, and configures the appropriate branch (see FIG. 2) for transmitting and receiving signals via this other transport system.

In a step 612, the ONU equipment 120 waits to detect optical signals with a carrier wavelength (or with a comb of carrier wavelengths) associated with the transport system configured (operation labelled DETECT in FIG. 6).

In a step 613, the ONU equipment 120 starts (startup labelled SYNCS in FIG. 6) an operation of synchronisation with the OLT equipment 110 according to the transport system configured. The ONU equipment 120 then submits its identifier, such as its serial number.

In a step 614, a control channel by means of the common protocol layer CP 410 is established between the OLT equipment 110 and the ONU equipment 120 (operation labelled M CHAN in FIG. 6) without waiting for the end of the synchronisation operation at the transport system configured by the ONU equipment 120.

Once the control channel is established, the ONU equipment 120 transmits (operation labelled REGID_T in FIG. 6) to the OLT equipment 110, in a step 615, the registration identifier RegID. The registration identifier RegID supplied here is different from the one previously supplied at the step 606, since the ONU equipment 120 uses another transport system.

In a step 616, the OLT equipment 110 obtains, at the common protocol layer CP 410, from the registration identifier RegID, the identifier of the ONU equipment 120 and the identifier of the transport system configured by the ONU equipment 120. Then the OLT equipment 110 checks, with the database DB 500, which transport system is declared in the user profile associated with the identifier submitted by the ONU equipment 120 (operation labelled P_CHK in FIG. 6).

In a step 617, the OLT equipment 110 checks that the transport system that is declared in the user profile corresponds to the identifier of the transport system configured by the ONU equipment 120. Let us consider here, by way of illustration, that this is the case. Then the common protocol layer CP 410 allows the synchronisation to continue with the ONU equipment 120. Then, in a step 617, the synchronisation operation continues and ends (end labelled SYNC_E in FIG. 6) between the OLT equipment 110 and the ONU equipment 120 for the transport system newly selected by the ONU equipment 120. Once the synchronisation operation has ended, the ONU equipment 120 can access the services defined in the user profile that is associated therewith, using the configured and synchronised transport system.

It is thus clear from the exchanges in FIG. 6 that, when the ONU equipment 120 uses by default a transport system that does not correspond to the transport system that corresponds to it in the user profile applicable, the ONU equipment 120 can test another transport system without waiting for the end of the synchronisation of the default transport system, which accelerates its being put in communication in the optical access network 100.

It should be noted that, should the ONU equipment 120 not detect any signals while being configured for the transport system defined by default (reference to the WanMode parameter) during a time window of predefined duration, then the ONU equipment 120 tests another transport system among those supported by the ONU equipment 120. This is because the service operator may have deleted the transport system in question from the optical access network 100.

It should also be noted that the transport system defined by default (reference to the WanMode parameter) may be modified by a means other than by messages coming from the OLT equipment 110, for example for test requirements.

It should also be noted that, in the event of loss of synchronisation, the ONU equipment 120 reiterates the above procedure in relation to FIG. 6.

The invention claimed is:

1. A method for putting an optical network unit ("ONU") in communication with optical line termination ("OLT") equipment in an optical access network offering various transport systems, the method causing:

the ONU to configure itself to communicate by means of a first transport system among at least two transport systems that are supported by the ONU wherein the ONU is a single ONU that supports the at least two transport systems, where each transport system is a communication set comprising a dedicated protocol, and said at least two transport systems are supervised by a protocol layer supervising any transport system of the optical access network;

the ONU to start a synchronisation with the OLT equipment for the first transport system;

the ONU to transmit, via the protocol layer supervising any transport system of the optical access network, without waiting for the synchronisation with the OLT equipment for the first transport system to have ended, information dependent on an identifier of the ONU and an identifier of the first transport system;

when the transport system to be used by ONU is not the first transport system, the protocol layer supervising any transport system of the optical access network at the OLT equipment interrupts the synchronisation, and the ONU reattempts the synchronisation with a second transport system among the transport systems supported by the ONU;

when the transport system to be used by the ONU is the first transport system, the OLT equipment continues the synchronisation for the first transport system until the ONU is put in communication in the optical access network.

2. The method according to claim 1, wherein the OLT equipment obtains, in a database, a user profile associated with the identifier of the ONU, the user profile including the transport system identifier to be used by the ONU.

3. The method according to claim 2, wherein, when no user profile is associated with the identifier of the ONU, the protocol layer supervising any transport system of the optical access network at the OLT equipment also interrupts the synchronisation.

4. The method according to claim 1, wherein said information is the juxtaposition of the identifier of the ONU and the identifier of the transport system configured by the ONU.

5. The method according to claim 1, wherein, when the ONU does not detect any signals, while being configured for the first transport system, during a time window of predefined duration, the ONU then tests another transport system among those supported by the ONU.

6. A method for putting an optical network unit ("ONU") in communication with optical line termination ("OLT") equipment in an optical access network, the method being implemented by the ONU, wherein the ONU is a single ONU that supports at least two transport systems, where each transport system is a communication set comprising a dedicated protocol, and said at least two transport systems are supervised by a protocol layer supervising any transport system of the optical access network, the method causing the ONU to perform:
- configuring itself to communicate by means of a first transport system among the transport systems supported by the ONU;
- starting a synchronisation with the OLT equipment for the first transport system;
- transmitting via the protocol layer supervising any transport system of the optical access network, without waiting for the synchronisation with the OLT equipment for the first transport system to have ended, information dependent on an identifier of the ONU and on an identifier of the first transport system;
- when the synchronisation is interrupted, reattempting the synchronisation with a second transport system among the transport systems supported by the ONU, and otherwise continuing the synchronisation for the first transport system until the ONU is put in communication in the optical access network.

7. A method for putting an optical network unit ("ONU") in communication with optical line termination ("OLT") equipment in an optical access network, wherein the ONU is a single ONU that supports at least two transport systems, where each transport system is a communication set comprising a dedicated protocol, and said at least two transport systems are supervised by a protocol layer supervising any transport system of the optical access network, wherein the method is implemented by the OLT equipment, the OLT equipment supporting various transport systems, each transport system being a communication set comprising a dedicated protocol, the method causing the OLT equipment to perform:
- starting a synchronisation with the ONU, at the initiative of the latter, for a first transport system;
- receiving, via the protocol layer supervising the transport systems which are supported by the OLT equipment, without waiting for the synchronisation with the ONU for the first transport system to have ended, information dependent on an identifier of the ONU and on an identifier of the first transport system;
- when the transport system to be used by the ONU is not the first transport system, interrupting the synchronisation by the protocol layer supervising any transport system of the optical access network;
- when the transport system to be used by the ONU is the first transport system, continuing the synchronisation for the first transport system until the ONU is put in communication in the optical access network.

8. A nontransitory computer readable storage medium embodying a computer program product comprising instructions for implementing, by a processor, the method according to claim 6, when said program is executed by said processor.

9. Non-transitory information storage medium storing a computer program comprising instructions for implementing, by a processor, the method according to according to claim 7, when said program is read and executed by said processor.

10. An optical network unit ("ONU") intended to be put in communication with optical line termination ("OLT") equipment in an optical access network, wherein the ONU is a single ONU that supports at least two transport systems, where each transport system is a communication set comprising a dedicated protocol, and said at least two transport systems are supervised by a protocol layer supervising any transport system of the optical access network, the ONU comprising circuitry causing the ONU to perform:
- configuring itself for communicating by means of a first transport system among the transport systems supported by the ONU;
- starting a synchronisation with the OLT equipment for the first transport system;
- transmitting, via the protocol layer supervising any transport system of the optical access network, without waiting for the synchronisation with the OLT equipment for the first transport system to have ended, information dependent on an identifier of the ONU and on an identifier of the first transport system;
- when the synchronisation is interrupted, reattempting the synchronisation with a second transport system among the transport systems supported by the ONU, and otherwise continuing the synchronisation for the first transport system until the ONU is put in communication in the optical access network.

11. An optical line termination ("OLT") equipment, intended to be put in communication with an output network unit ("ONU") in an optical access network, wherein the ONU is a single ONU that supports at least two transport systems, where each transport system is a communication set comprising a dedicated protocol, and said at least two transport systems are supervised by a protocol layer supervising any transport system of the optical access network, wherein the OLT equipment supports various transport systems, each transport system being a communication set comprising a dedicated protocol, the OLT equipment comprising circuitry causing the OLT equipment to perform:
- starting a synchronisation with the ONU, at the initiative of the latter, for a first transport system;
- receiving, via the protocol layer supervising the transport systems which are supported by the OLT equipment, without waiting for the synchronisation with the ONU for the first transport system to have ended, information dependent on an identifier of the ONU and on an identifier of the first transport system;
- when the transport system to be used by the ONU is not the first transport system, interrupting the synchronisation by the protocol layer supervising any transport system of the optical access network;
- when the transport system to be used by the ONU is the first transport system, continuing the synchronisation for the first transport system until the ONU is put in communication in the optical access network.

12. An optical access network comprising an optical line termination ("OLT") equipment according to claim 11.

13. An optical access network comprising at least one optical network unit ("ONU") according to claim 10.

* * * * *